(12) United States Patent
Eguiluz et al.

(10) Patent No.: US 11,016,587 B2
(45) Date of Patent: May 25, 2021

(54) WATCH CROWN HAPTIC SUPPORT TO PROVIDE DETENT-LIKE OPERATION

(71) Applicant: Apple Inc., Cupertino, CA (US)

(72) Inventors: Hernan R. Eguiluz, Cupertino, CA (US); Michael J. Lamb, Cupertino, CA (US); Kevin Tyler McAtee, Mountain View, CA (US); Dylan R. Edwards, San Jose, CA (US)

(73) Assignee: Apple Inc., Cupertino, CA (US)

( * ) Notice: Subject to any disclaimer, the term of this patent is extended or adjusted under 35 U.S.C. 154(b) by 21 days.

(21) Appl. No.: 16/232,284

(22) Filed: Dec. 26, 2018

(65) Prior Publication Data

US 2020/0081556 A1    Mar. 12, 2020

Related U.S. Application Data

(60) Provisional application No. 62/729,898, filed on Sep. 11, 2018.

(51) Int. Cl.
| | | |
|---|---|---|
| G06F 3/0362 | (2013.01) | |
| G06F 9/451 | (2018.01) | |
| G06F 3/01 | (2006.01) | |
| G06F 3/16 | (2006.01) | |

(52) U.S. Cl.
CPC ............ *G06F 3/0362* (2013.01); *G06F 3/016* (2013.01); *G06F 3/167* (2013.01); *G06F 9/451* (2018.02)

(58) Field of Classification Search
CPC .......... G06F 3/048; G06F 3/01; G06F 3/0362; G06F 3/016; G06F 9/451; G06F 3/16
See application file for complete search history.

(56) References Cited

U.S. PATENT DOCUMENTS

| | | | |
|---|---|---|---|
| 7,233,313 B2 | 6/2007 | Levin et al. | |
| 9,449,476 B2* | 9/2016 | Lynn et al. | ............ G06F 3/0416 345/173 |
| 9,753,436 B2 | 9/2017 | Ely et al. | |
| 9,921,652 B2 | 3/2018 | Moussette et al. | |
| 9,971,407 B2 | 5/2018 | Holenarsipur et al. | |
| 2014/0143784 A1 | 5/2014 | Misty et al. | |
| 2015/0370529 A1* | 12/2015 | Zambetti | ............... G06F 3/0482 345/156 |
| 2016/0062464 A1* | 3/2016 | Moussette et al. | ..... G06F 3/016 345/173 |
| 2017/0016748 A1* | 1/2017 | Song et al. | ............. G01D 5/58 702/151 |

(Continued)

FOREIGN PATENT DOCUMENTS

WO    2016168097 A1    10/2016

*Primary Examiner* — Kwang-Su Yang
(74) *Attorney, Agent, or Firm* — Kowert, Hood, Munyon, Rankin & Goetzel, P.C.; Lawrence J. Merkel (57) ABSTRACT

In an embodiment, a system implements detent operation using tactile and audio effects that give the user the effect of a detent without including the mechanical devices that detents would normally imply. The detent operation may be implemented in software and may be synchronized to events on the display of the system (e.g. animation events), which may provide a convincing user experience. A low latency path from the applications and user interface program of the system to the hardware that implements the detent operation may be provided to help ensure that the synchronization of animation events and detent operations is maintained.

20 Claims, 9 Drawing Sheets

(56) References Cited

U.S. PATENT DOCUMENTS

2017/0255266 A1     9/2017  Holenarsipur et al.
2017/0371414 A1*   12/2017  Keslin et al. ......... G06F 3/0316
                                                      715/702

\* cited by examiner

| Detent Table 60 | | | | |
|---|---|---|---|---|
| CW Mech | Haptic | Audio | Default Gain Haptic | Default Gain Audio |
| CCW Mech | Haptic | Audio | Default Gain Haptic | Default Gain Audio |
| Weak | Haptic | Audio | Default Gain Haptic | Default Gain Audio |
| Standard | Haptic | Audio | Default Gain Haptic | Default Gain Audio |
| Strong | Haptic | Audio | Default Gain Haptic | Default Gain Audio |
| Limit | Haptic | Audio | Default Gain Haptic | Default Gain Audio |
| Impact | Haptic | Audio | Default Gain Haptic | Default Gain Audio |

WATCH CROWN HAPTIC SUPPORT TO PROVIDE DETENT-LIKE OPERATION

This application claims benefit of priority to U.S. Provisional Patent Application Ser. No. 62/729,898, filed on Sep. 11, 2018. The above application is incorporated herein by reference in its entirety. To the extent that any of the incorporated material conflicts with the material expressly set forth herein, the expressly set forth material controls.

BACKGROUND

Technical Field

Embodiments described herein are related to haptic support to provide detent-like operation in a crown for a watch or other electronic device.

Description of the Related Art

Watches and other wrist-worn devices often have a crown which can be used to adjust or access various features of the watch. The crown can be knob, button, or other rotatable projection on the watch body that can be manipulated by the user. Typically, the crown can be rotated, and may also be pulled or pushed to change the features affected by the crown. In a mechanical watch, the crown is rotated to wind the watch, adding energy to the watch spring or other energy storage in the watch. Additionally, the time may be adjusted on various types of watches by rotating the crown. In more advanced watches, such as "smart watches" that include compute functionality in addition to time-telling features, the crown may be used as a user input device to navigate features displayed on the watch, select options, etc.

In some watches, the crown is attached to a shaft with a detent. Generally, a detent is a mechanism that resists or arrests the rotation of the shaft/crown, until enough energy is applied to overcome the resistance. The detent can divide the rotation of the crown into discrete increments, for example. There are a variety of mechanical devices that can be used to make a detent. Typically, when the detent moves from position to position, there is a tactile and audible click that can be felt/heard by the user.

In a more advanced watch, it is often undesirable to include the mechanical devices often used to implement a detent. The devices may be larger than desired to incorporate into the watch. Additionally, the mechanical operation may cause undesirable interference with the operation of the rest of the watch. However, the user experience of the detent can be useful and enhance the operation of the device.

SUMMARY

In an embodiment, a system implements detent operations using tactile and audio effects that give the user the effect of a detent without including the mechanical devices that detents would normally imply. The detent operation may be implemented in software and may be synchronized to events on the display of the system (e.g. animation events), which may provide a convincing user experience. A low latency path from the applications and user interface program of the system to the hardware that implements the detent operation may be provided to help ensure that the synchronization of animation events and detent operations is maintained.

BRIEF DESCRIPTION OF THE DRAWINGS

The following detailed description makes reference to the accompanying drawings, which are now briefly described.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

Wearable Device Overview

Figure 1:
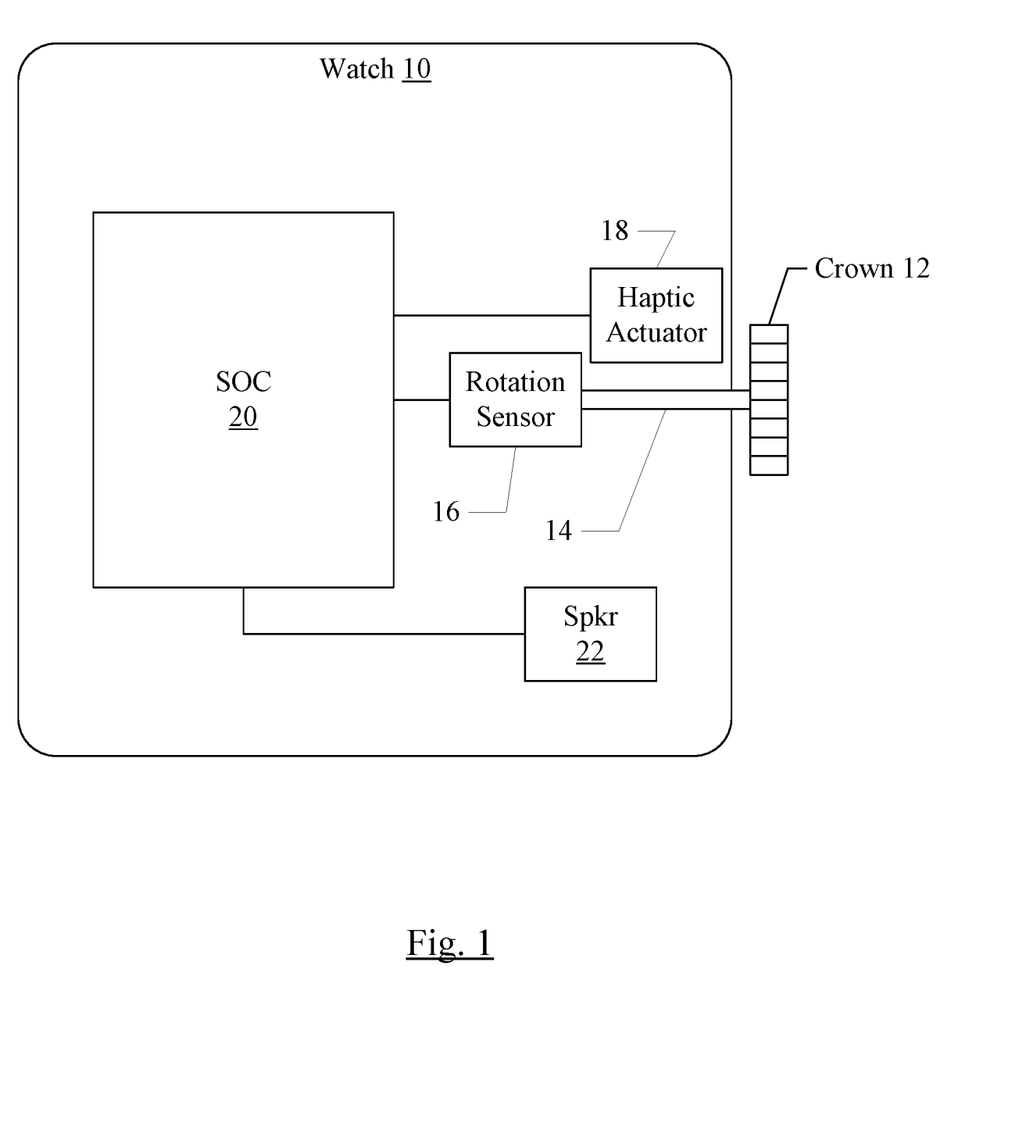
FIG. 1 is a block diagram of one embodiment of a watch.

Turning to FIG. 1, a block diagram of one embodiment of a watch 10 is shown. Other embodiments may be any form of wrist-worn device (e.g. fitness tracking devices) or devices worn on other parts of the body (e.g. ankles, or anywhere on the body in which a detent event might be sensed by the user). The face of the watch 10 may be a display screen (not shown in FIG. 1) on which the watch features such as time and date may be displayed, as well as other features of a smart watch such as notifications, applications, application options, etc. The display screen may be a touchscreen that permits user interaction via finger touches on the screen. The watch 10 may include a crown 12 that may be rotated to interact with the watch 10. The crown 12 may be coupled to a shaft 14 that extends into the body of the watch 10 and couples to a rotation sensor 16. The rotation sensor 16 may be coupled to a system on a chip (SOC) 20, which may be coupled to a haptic actuator 18. The SOC 20 may also be coupled to a speaker (spkr) 22 in the watch 10.

The rotation sensor 16 may be configured to sense rotation of the crown 12, and may output data indicating how much rotation is being sensed (e.g. a number of degrees of rotation detected, a number of radians, or any other measure of rotation amount). The rotation sensor 16 may be a continuous sensor that permits free rotation, as compared to a detent mechanism which would limit the rotational movement. The rotation sensor 16 may be configured to report measurements, or respond to requests for the measurements, to/from the SOC 20. The SOC 20 may include one or more processors that may be configured to execute instructions such as the instructions forming a user interface program and/or a detent library, that may use the rotation measurements (directly or indirectly) to trigger detent operations.

The detent operations may include a haptic component that is provided to the haptic actuator 18 and an audio component that is provided to the speaker 22. The haptic actuator 18 may be any circuit that is configured to produce a vibration or other force that provides a tactile sensation for a human. Particularly, in an embodiment, the haptic actuator 18 may be configured to produce a sensation of a click, such as would occur if a detent moves from position to position. The haptic actuator 18 may be configured to produce other tactile sensations as well, if desired. In an embodiment, the haptic actuator 18 may be a linear resonant actuator, a piezoelectric actuator, or an eccentric rotating mass actuator, for example. However, any actuator may be used.

The haptic actuator may be physically located near the crown 12 on the watch 10, so that the vibration or other output from the haptic actuator 18 may be sensed near/at the crown 12 and may cause the user to feel a realistic detent effect. The sound of a click may be concurrently played over the speaker 22 to further enhance the effect, in an embodiment.

SOC Overview

Figure 2:
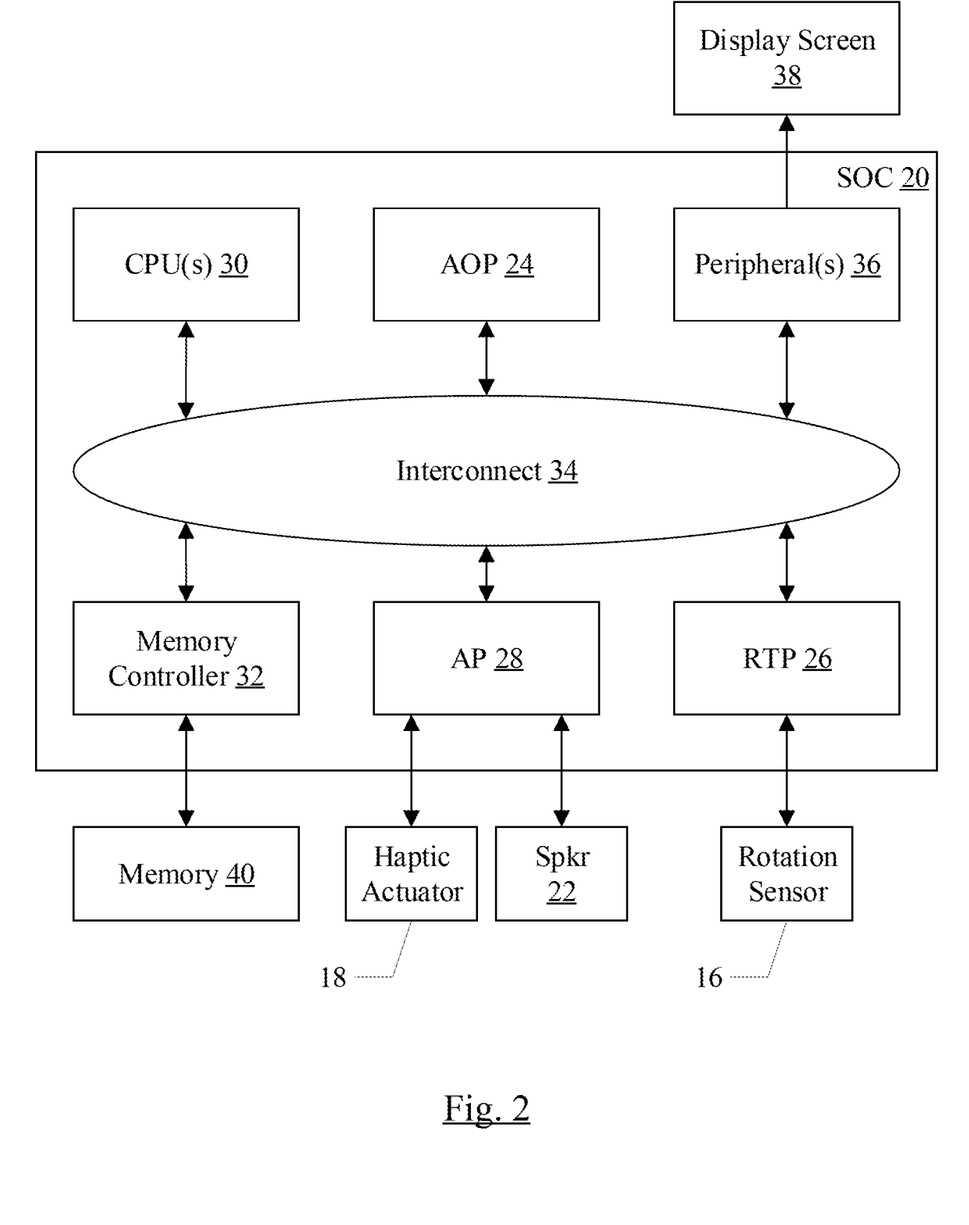
FIG. 2 is a block diagram of one embodiment of a system on a chip (SOC) that may be included in the watch.

FIG. 2 is a block diagram illustrating one embodiment of the SOC 20. In the embodiment of FIG. 2, the SOC 20 includes one or more central processing units (CPUs) 30, an always-on processor (AOP) 24, one or more peripheral components ("peripherals") 36, one or more audio processors (APs) 28, a memory controller 32, a real time processor (RTP) 26, and an interconnect 34. The memory controller 32 may be coupled to a memory 40, which may be external to the SOC 20 in this embodiment. The peripherals 36 may include a display controller coupled to a display screen 38. The RTP 26 may be coupled to the rotation sensor 16. The audio processor 28 may be coupled to the haptic actuator 18 and the speaker 22. The CPUs 10, AOP 24, peripherals 36, RTP 26, AP 28, and memory controller 32 may be coupled to the interconnect 34. The memory 40 may be coupled to the SOC 20 in any desired fashion. For example, the memory 40 may be mounted on the SOC 20 in a package on package or chip on chip configuration, may be provided in a multichip module solution with the SOC, or may be attached to a circuit board. Other embodiments may use other levels of integration and/or discrete circuits.

The various processors in the computer system (CPUs 30, AOP 24, RTP 26, and AP 28) may generally be capable of executing instructions from the instruction set defined by an instruction set architecture implemented by those processors. Different processors may implement different instruction set architectures. For example, the CPUs 30 may implement a general purpose instruction set architecture, while the AP 28 may implement an instruction set architecture targeted at audio processing. The RTP 26 and the AOP 24 may also implement a general purpose instruction set architecture. In an embodiment, the RTP 26 and the AOP 24 may implement the same instruction set architecture as the CPUs 30, although the RTP 26 and the AOP 24 need not be the same design as the CPUs 30. For example, the AOP 24 may be designed to one or more power efficient operating points that are sufficient for the tasks to be performed by the AOP 24, while the CPUs 30 may be designed to one or more higher performance operating points. The RTP 26 may be optimized for real time processing, in which predictable latencies for execution may be more important than high performance (e.g. speculation may be reduced in the RTP 26 because the delays incurred when misspeculation occurs may be undesirable).

The peripherals 36 may be any type of peripheral components and/or controllers for peripheral interfaces. For example, the peripherals 36 may be any set of additional hardware functionality included in the system. In an embodiment, the peripherals 36 may include video peripherals such as one or more image signal processors (ISPs), which may be configured to process image capture data from a camera or other image sensor, one or more display controllers configured to display video data on one or more display devices such as the display screen 38, one or more graphics processing units (GPUs) 14 configured to render display images, video encoder/decoders, scalers, rotators, blenders, etc. The peripherals 36 may include audio peripherals such as the AP(s) 28, microphones, speakers, interfaces to microphones and speakers, audio processors, digital signal processors, mixers, etc. The peripherals 36 may include interface controllers for various interfaces including interfaces such as Universal Serial Bus (USB), peripheral component interconnect (PCI) including PCI Express (PCIe), serial and parallel ports, etc. The peripherals 36 may include networking peripherals such as media access controllers (MACs). The peripherals 36 may include devices for various types of wireless communication, such as wifi, Bluetooth, cellular, global positioning system, etc. The peripherals 36 may also include additional storage, including RAM storage, solid state storage, or disk storage (e.g. magnetic or optical). The peripherals 36 may include user interface devices such as the display screen 38, including touch display screens or multitouch display screens, keyboard or other input devices, etc.

The memory controller 32 may generally include the circuitry for receiving memory operations from the other components of the system and for accessing the memory 40 to complete the memory operations. The memory controller 32 may be configured to access any type of memory 40. For example, the memory 40 may be static random access memory (SRAM), dynamic RAM (DRAM) such as synchronous DRAM (SDRAM) including double data rate (DDR, DDR2, DDR3, DDR4, etc.) DRAM, RAMBUS DRAM, etc. Low power/mobile versions of the DDR DRAM may be supported (e.g. LPDDR, mDDR, etc.). The memory 40 may include one or more memory modules to which the memory devices are mounted, such as single inline memory modules (SIMMs), dual inline memory modules (DIMMs), etc. Alternatively, the memory 40 may include one or more memory devices that are mounted on the SOC 20 in a chip-on-chip or package-on-package implementation.

The memory controller 32 may include queues for memory operations, for ordering (and potentially reordering) the operations and presenting the operations to the memory 40. The memory controller 32 may further include data buffers to store write data awaiting write to memory and read data awaiting return to the source of the memory operation. In some embodiments, the memory controller 32 may include a memory cache to store recently accessed memory data. The memory cache may reduce power consumption in the SOC 20 by avoiding reaccess of data from the memory 40 if it is expected to be accessed again soon. In some cases, the memory cache may also be referred to as a system cache, as opposed to private caches such as the L2 cache or caches in the processors, which serve only certain components. Additionally, in some embodiments, a system cache need not be located within the memory controller 32.

The interconnect 34 may be any communication interconnect/fabric and protocol for communicating among the components of the system. The interconnect 34 may be bus-based, including shared bus configurations, cross bar configurations, and hierarchical buses with bridges. The interconnect 34 may also be packet-based, and may be hierarchical with bridges, cross bar, point-to-point, or other interconnects.

Various embodiments of the SOC 20 may include any combination or subcombination of the components illustrated in FIG. 2, and/or any additional components, as desired.

Detent System

Figure 3:
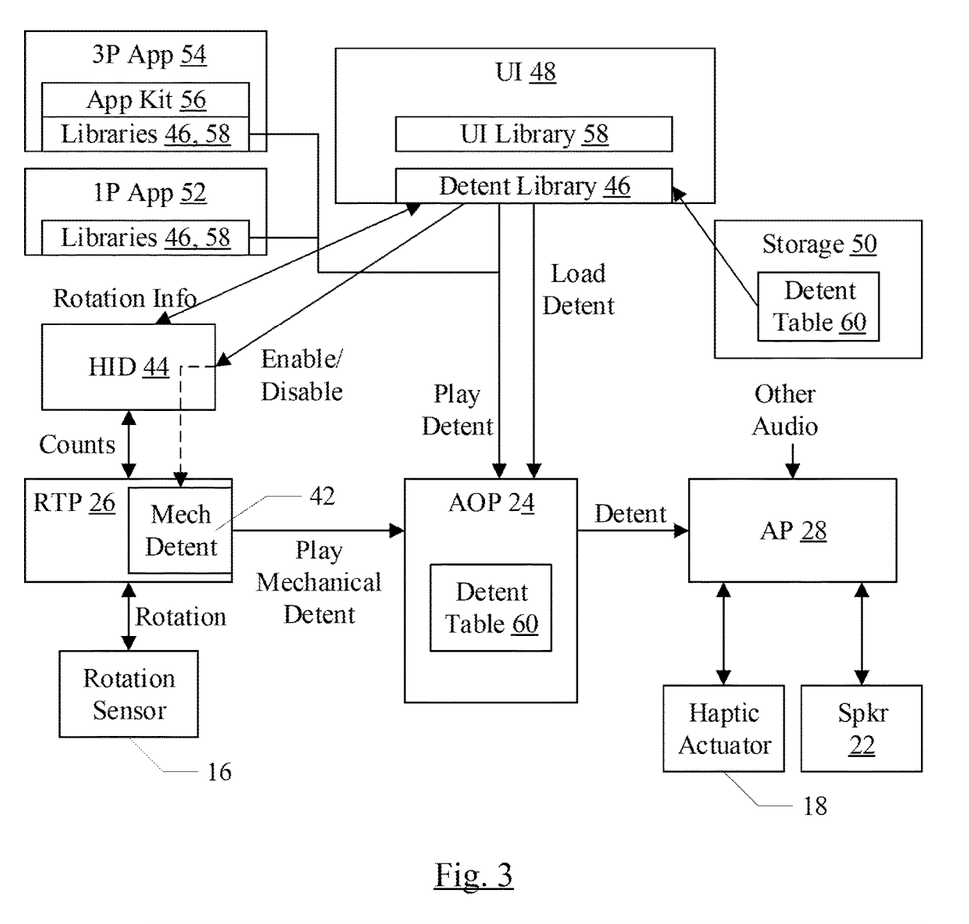
FIG. 3 is a block diagram illustrating components of the watch and interaction between the components for one embodiment of a detent implementation.

FIG. 3 is a block diagram illustrating various hardware, firmware, and software components of a system that implements detent operations using the haptic actuator 18 and the speaker 22. In the illustrated embodiment, the components including the rotation sensor 16 coupled to the RTP 26 (which may execute a mechanical detent program 42 that may be firmware in this embodiment). The RTP 26 may also be configured to provide counts of rotation to the human interface device service (HID) 44, which may be coupled to a detent library 46 and user interface (UI) program 48. The detent library 46 may also be coupled to the mechanical detent program 42, the AOP 24, and a storage device 50. A UI library 58 is also shown, which may perform introspection for various UI elements in a scroll view as discussed in more detail below. The detent library 46 and UI library 58 may be shared by application programs (apps) such as a first party (1P) app 52 and a third party (3P) app 54. The third party app 54 may access the detent library 46/UI library 58 through an app kit 56. The AOP 24 is coupled to the AP 28, which is coupled to the haptic actuator 18 and the speaker 22.

As previously mentioned, the rotation sensor 16 may detect rotation of the crown 12 and may report data describing the rotation to the RTP 26. The rotation sensor 16 may provide data at regular intervals according to a sample rate for the sensor, e.g. on the order of Hertz (Hz) to kilohertz (kHz). For example, in one embodiment, sample rates in the range of about 32 Hz to 8 kHz may be used, although higher and lower sample rates may be used in other embodiments. The samples may indicate the amount of rotation that has occurred within the sample interval (e.g. degrees, radians, or other rotation measure). The RTP 26 may process the samples, including processing by the mechanical detent program 42. The mechanical detent program 42 may issue a request for a mechanical detent operation to the AOP 24 at a periodic rate based on the amount of sensed rotation ("play mechanical detent" in FIG. 3). That is, the mechanical detent operation may be a periodic detent operation based on an amount of movement of the crown.

The mechanical detent operation may be one detent operation supported in the system. The mechanical detent may be perceived by the user as a light (less forceful) click representing a predetermined amount of movement of the crown, as if the crown is clicking through the detents of a mechanical device. Major detents, described below, may be another detent operation supported by the system. The major detents may be more forceful than mechanical detents in general and may be associated with animation events or other display changes on the display screen 38. The detent operations may be programmable in a detent table 60 in the AOP 24 in some embodiments, and thus mechanical and major detent operations may be programmed to any desired force.

A "detent operation" may be an operation performed by the system to simulate a detent for the user of the system (e.g. the person wearing the watch 10). The detent operation may include a haptic component performed by the haptic actuator 18, and optionally an audio component performed by the speaker 22. The system may be said to perform a detent operation, which may refer to the system causing the haptic actuator 18 and the speaker 22 to operate in a fashion that simulates the detent. The description herein may refer to "playing" a detent operation, which may be synonymous with performing a detent operation.

More particularly, the request for detent operation may specify an entry in the detent table 60 for the detent operation. The entry may specify the operation of the haptic actuator 18 and the speaker 22 to carry out the operation, and may also include default gains to be applied to the operations if the request does not include an explicit gain. The data may describe a wave form to be played by the haptic actuator (scaled according to the explicit or default gain) and a wave form to be played by the speaker 22 (scaled according to an explicit or default gain). The gains may be independently specified for the haptic and audio portions of the detent operation, in an embodiment.

The AOP 24 may provide the detent operation data to the AP 28 ("detent" in FIG. 3), which may perform the scaling according to the gains and may format the data as required by the haptic actuator 18 and the speaker 22. The AP 28 may also receive other audio data from other parts of the system, and may arbitrate between the detent operations and the other audio data to drive the speaker 22. In an embodiment, it may also be possible for components of the system other than the AOP 24 to request detent operations directly from the AP 28. The AP 28 may arbitrate between these directly requested detent operations and the detent operations from the AOP 24. Generally, the arbitration may favor the directly-requested detent operations and/or other audio over detent operations from the AOP 24.

In addition to requesting mechanical detents, the RTP 26 may provide rotation counts ("Counts") to the HID 44, which may provide rotation information to the detent library 46/UI library 58. The rotation information may be interpreted and applied to UI elements being displayed on the display screen 38, and may result in major detent operations being requested by the detent library 46. The rotation information may also be provided directly to the apps 52 and 54 as well, in some embodiments. The UI 48 may generate request for detent operations, in an embodiment. In an embodiment, apps such as the apps 52 and 54 may share the detent library 46 and may generate requests for detent operations as well. The requests ("play detent") in FIG. 3 may specify the detent operation to perform and may, in some cases, provide a gain for the haptic and/or audio portion of the detent operation.

The AOP 24 may read the detent operation data from the detent table 60 and provide the data to the AP 28 to perform the detent operation, similar to the discussion above with regard to mechanical detents. The detent operations request by the detent library 46 may be referred to as major detent operations (or major detents). The major detent operations may have several levels, each of which may be a different detent operation and different entry in the detent table 60. Which of the major detent operations to use may be determined by the UI program 48 and/or apps 52 and 54, based on the animation events that are occurring on the display screen 38.

The detent library 46 may also disable mechanical detent operations when major detent operations are being requested, so that the mechanical detents and major detents do not overlap or interfere with each other. The detent library 46 may communicate disable and enable requests to the HID 44, which may communicate control information to the RTP 26 to disable/enable mechanical detent program 42 (dotted line as shown in FIG. 3). In other embodiments, the enable/disable for mechanical detent operations may be communicated directly between the detent library 46 and the mechanical detent program 42.

In an embodiment, the UI program 48/detent library 46 may be configured to program the detent table 60 during system initialization. Particularly, the detent table 60 may be stored in a non-volatile storage 50, and may be read by the UI program 48/detent library 46 and loaded into the AOP 24. In some embodiments, dynamic reconfiguration of the detent table 60 may be supported and the UI program 48/detent library 46 may be configured to load the detent table 60 (or modify the detent table 60) at times other than initialization.

In an embodiment, there may be at least two types of apps in the system: first party apps 52 and third party apps 54. First party apps 52 may be apps developed by the same entity that developed the UI 48/detent library 46 (e.g. the same company, such as the company that manufactures and sells the watch 10). Third party apps 54 may be developed by separate entities, and may be less trusted in the system. Thus, the third party apps 54 may access the detent library 46 through an app kit 56, which may supply functionality of various types to the third party app 54. The app kit 56 may limit that detent operations that may be requested by the third party app 54, to avoid a poor user experience that might occur from a nefarious third party app 54 that is attempting to intentionally degrade the user experience of the watch 10. Various limitations will be described in greater detail below.

Figure 4:
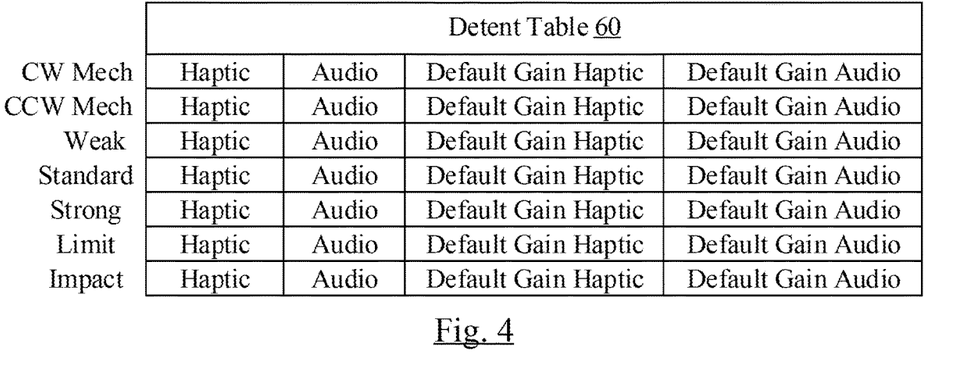
FIG. 4 is a block diagram of one embodiment of a detent table.

FIG. 4 is a block diagram of one embodiment of the detent table 60. Other embodiments may include more or fewer entries in the detent table 60. Other embodiments may specify more or fewer detent operations, subsets of the illustrated detent operations and other operations, or supersets of the illustrated detent operations and other operations. Each entry in the table stores a haptic component (e.g. a wave form to be played by the haptic actuator 18), an audio component (e.g. a wave form to be played by the speaker 22), a default gain for the haptic component, and a default gain for the audio component.

In the illustrated embodiment, the detent table 60 includes two mechanical detent operations: one for clockwise rotation (CW) and one for counter clockwise rotation (CCW). The major detent operations may include a weak detent operation, a standard detent operation, a strong detent operation, and a limit detent operation. The impact detent operation may also be a major detent operation, or may be considered to be a separate detent operation, in various embodiments.

The weak detent operation may be the least intense major detent operation; the standard detent operation may be more intense than the weak detent operation; and the strong detent operation may be more intense than the standard detent operation. In an embodiment, the limit detent operation may include the same haptic component as the strong detent operation, but may have a different audio component and gains.

Generally, the weaker major detent operations may be used when the frequency of occurrence of major detents is higher, reducing the intensity experienced by the user to prevent the user from being overwhelmed. Various examples will be described in more detail below.

In an embodiment, the impact detent may not be tied to the movement of the crown 12. Instead, the impact detent may be used to obtain the user's attention if a UI element is popping up on the display screen 38 (e.g. a message, a notification of an event, etc.).

Each detent operation may differ from the others in different ways. For example, two detent operations may share the same haptic and/or audio components, but may have different default gains. For example, in an embodiment, the standard and strong detent operations may use the same haptic and audio components but may have different default gains. The weak detent operation may have different haptic and audio components than the standard and strong detent operations (and different gains as well). Any combination of one or more differences in the haptic component, the audio component, the default haptic gain, and the default audio gain may be used to define different detent operations.

Figure 5:
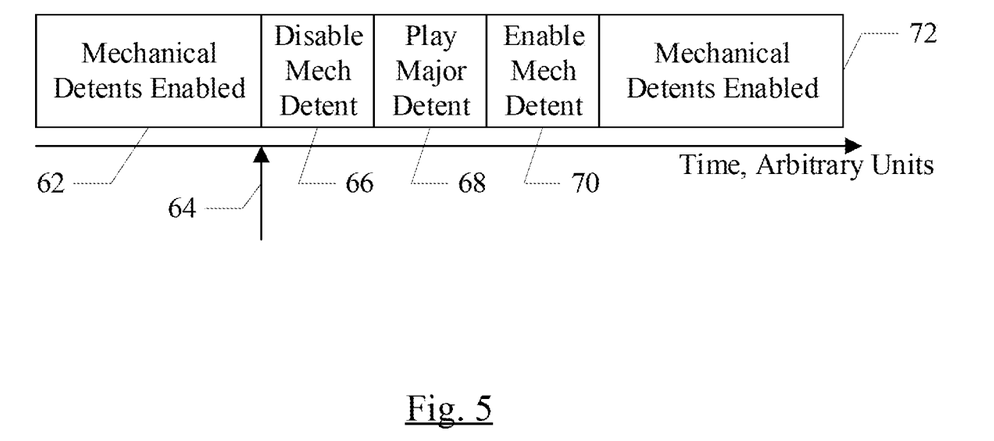
FIG. 5 is a timing diagram illustrating mechanical and major detents.

Turning next to FIG. 5, a timing diagram illustrating the operation of one embodiment of the UI program 48/detent library 46 is shown. Time increases from left to right in FIG. 5, in arbitrary units. During normal operation, mechanical detents may be enabled (reference numeral 62), until a major detent event is detected by the UI program 48 or one of the apps 52 or 54 (arrow 64). The UI program 48/app 52 or 54 may call the detent library 46 to request the major detent operation assigned to the event, and the detent library 46 may transmit a disable command to disable mechanical detent operations (reference numeral 66), play the major detent by requesting the major detent operation to the AOP 24 (reference numeral 68), and then enable the mechanical detent operations again after the major detent operation is complete by transmitting an enable command (reference numeral 70). The mechanical detents may then remain enabled (reference numeral 72) until a major detent is detected again.

While the timeline in FIG. 5 illustrates playing one major detent and re-enabling the mechanical detents upon completion of the major detent, other embodiments may perform more than one major detent operation before re-enabling mechanical detents. For example, in an embodiment, the detent library 46 may wait for a timeout after each major detent to determine if another major detent event is detected (and may play the subsequently detected major detent operations) before re-enabling mechanical detents.

It is noted that the blocks on the timeline in FIG. 5 may not be to scale. For example, the enabling and disabling of mechanical detents may not consume about the same amount of time as playing the major detent operation, as implied by the blocks 66, 68, and 70 in FIG. 5. The enabling and disabling may be shorter, for example.

Figure 6:
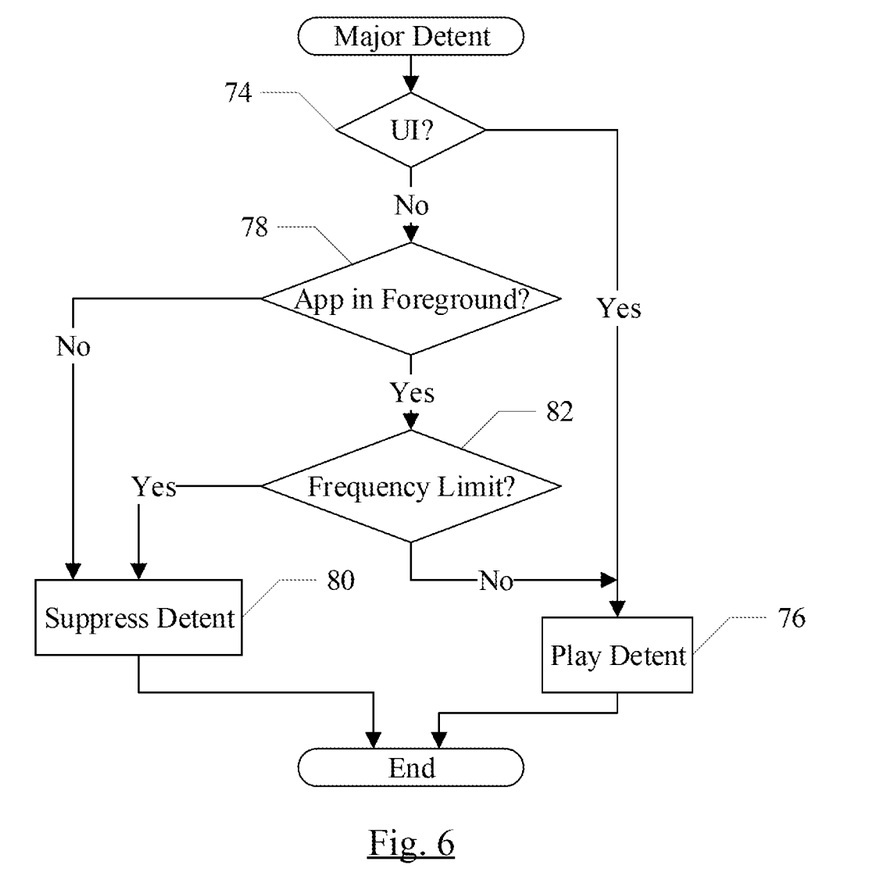
FIG. 6 is a flowchart illustrating operation of one embodiment in response to a major detent operation request.

FIG. 6 is a flowchart illustrating operation of the system in response to a major detent operation request, for one embodiment. While the blocks are shown in a particular order for ease of understanding, other orders may be used. The app kit 56, detent library 46, UI library 58, and/or UI program 48 may include instructions which, when executed, implement the operation shown in FIG. 6.

If the major detent operation is being requested by the UI program 48 (decision block 74, "yes" leg), the system may play the major detent operation (block 76). That is, there may be no limits applied to the UI program 48. It is trusted to provide a good user experience/operation. If the major detent operation is not being requested by the UI program 48 (decision block 74, "no" leg), the major detent operation is being requested by an app 52 or 54. One or more limits may be applied to the major detent operations requested by apps 52 or 54. In one embodiment, the app 52 or 54 may be required to be in the foreground on the display screen 38 (e.g. visible and active on the display screen 38) (decision block 78). If app 52 or 54 is not in the foreground (decision block 78, "no" leg), the system may suppress the major detent operation (block 80). For example, the detent library 46, when called to transmit the major detent operation request, may detect that the app 52 or 54 is not in the foreground and may drop the request. In an embodiment, the foreground requirement may be applied by default to the first party app 52, but the first party app 52 may be permitted to disable the limit and perform major detent operations when running in the background. The third party app 54 may not be permitted to disable the limit.

The apps 52 or 54 may also have a frequency limit (i.e. how often they may play a major detent event in a given period of time). The frequency limit may help ensure that apps do not overwhelm the user with too many detents. The limit may different between first party app 52 and third party app 54, or may be the same limit, in various embodiments. If the major detent operation request would exceed the frequency limit (decision block 82, "yes" leg), the system may suppress the major detent operation. In one embodiment, the frequency limit may be implemented in the AOP 24 and/or the AP 28. Other embodiments may implement the limit in the detent library 46.

If the limits do not cause the major detent operation to be suppressed (decision block 78, "yes" leg and decision block 82, "no" leg), the system may play the major detent operation (block 76). Other limits may be implemented in other embodiments. For example, in an embodiment, third party apps 54 may be permitted to request detent operations but may not be permitted to modify the default gains.

Figure 7:
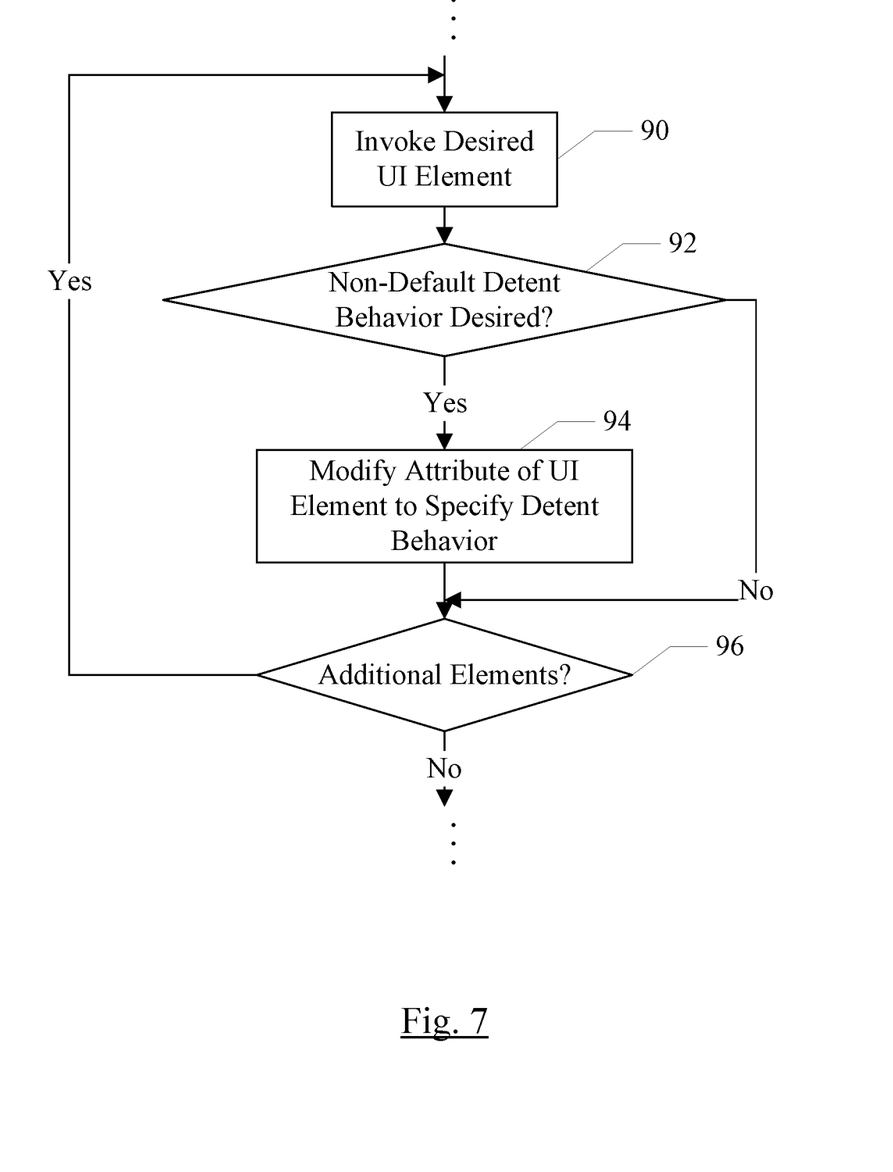
FIG. 7 is a flowchart illustrating operation of one embodiment of an application (app) invoking user interface (UI) elements.

Turning now to FIG. 7, a flowchart is shown illustrating operation of a portion of one embodiment of an app 52 or 54. The portion shown in FIG. 7 may be performed when the app initializes, specifying various UI elements that the app will use, their behavior, etc. The portion may also be executed at other times if the app 52 or 54 dynamically changes its UI element configuration. While the blocks are shown in a particular order in FIG. 7 for ease of understanding, other orders may be used. The app 52 or 54 may include instructions which, when executed by a processor in the system, cause the system to implement the operation shown in FIG. 7.

In one embodiment, an app has a "scroll view" into which it instantiates its UI elements to display information to the user and provide the user with selections to interact with the user. There may be a variety of UI elements, such as platters, table entries, various graphical elements, and others. A platter may be an element in which the app may display a significant amount of information (e.g. sentences or paragraphs of text for the user to read, graphical elements that are large compared to the size of the display screen 38, etc.). Platters may be displayed end to end in scroll view, or in a 3 dimensional effect in which the platters overlay each other partially, illustrated in FIG. 13 and described in more detail below. Table entries may be used for relatively smaller amounts of information such as menu items. Table entries may be displayed end to end in a scroll view, in an embodiment. UI elements may be nested, creating a hierarchy of elements that may be navigated by the user. For example, a table entry that is a menu item, if selected by the user, may invoke another set of table elements that are menu times selected by the initial menu items (a "sub menu" of the main menu that includes the initial menu item).

The app may invoke a desired UI element (block 90), placing the UI element in its scroll view at a desired point. If the app prefers to associate a non-default detent behavior with the UI element (decision block 92, "yes" leg), the app may modify the attributes of the UI element to specify the desired detent behavior (block 94). If the default detent behavior is acceptable to/desired by the app (decision block 92, "no" leg), the app need not modify the detent attributes. The UI element may have a variety of other attributes that the app may modify, not shown in FIG. 7. In either case, if there are more UI elements to be invoked (decision block 96, "yes" leg), the app may invoke the next element (block 90) and repeat the process of specifying detent behavior.

There are a variety of changes that the app may be permitted to make to the default detent behaviors of UI elements. For example, the app may be permitted to disable mechanical detent operations for the UI element. The app may be permitted to disable major detent operations for the element and use the mechanical detent operations for smooth scrolling through the UI element. The app may be configured to disable notch behavior for the UI element (described in more detail below). Disabling notch behavior may be desirable, e.g., if the UI element is larger than the display screen 38 may display, such as a significant amount of text. If the user is reading the text, using a smooth scroll over the UI element may be more desirable than the snap movement between notches. The notch behavior might be visually confusing to the user, or may even cause the user to miss information that is being displayed.

Figure 8:
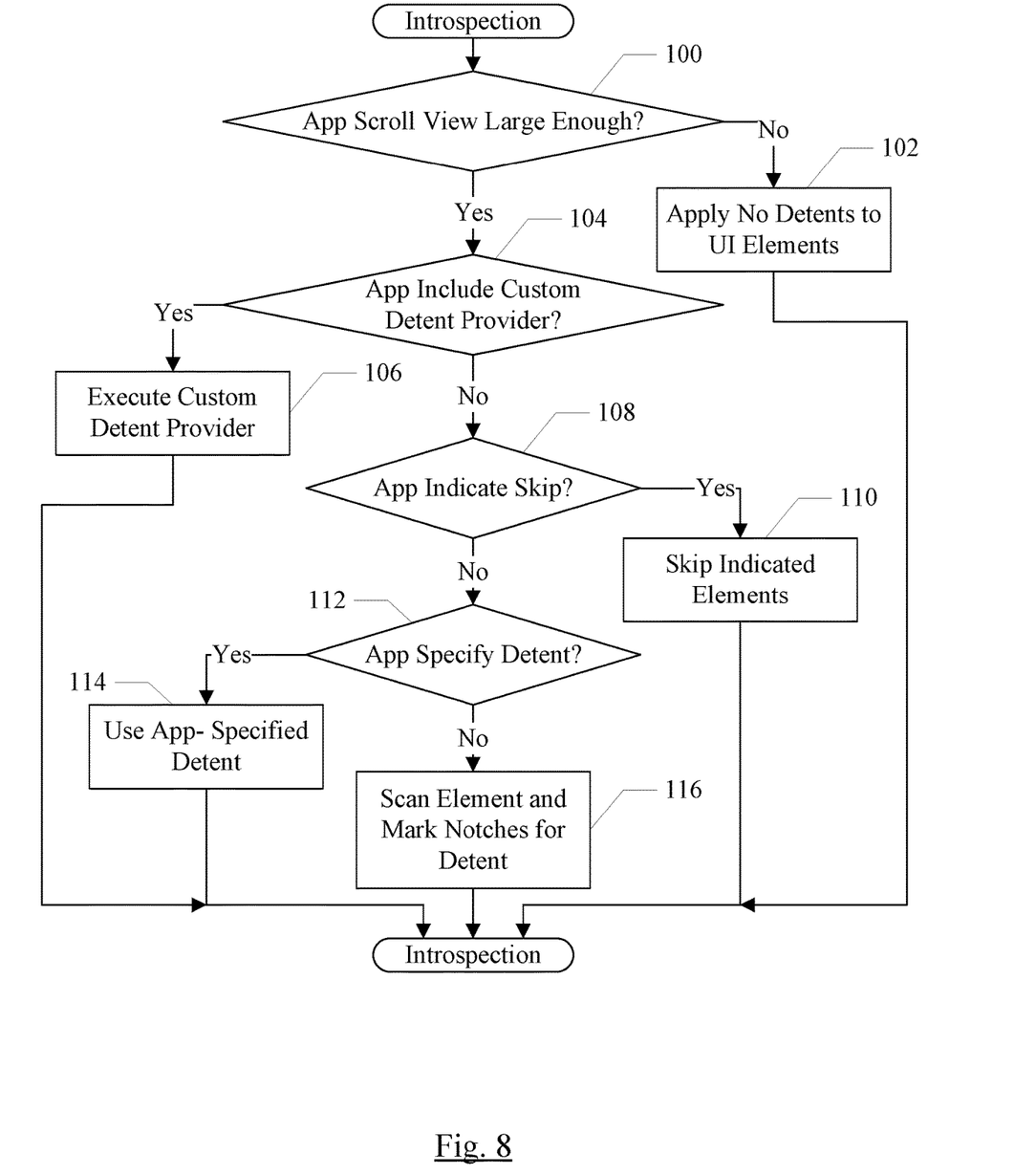
FIG. 8 is a flowchart illustrating operation of one embodiment of a user interface program performing introspection to assign detent behavior to an app's UI elements.

FIG. 8 is a flowchart illustrating operation of one embodiment of the UI library 58 to perform introspection on an app's scroll view to apply detent behavior to the view. In other embodiments, any class or object instantiated by an app may be subject to introspection, the scroll view is merely an example. Introspection may generally refer to the ability of a program or process (e.g. the UI library 58) to examine properties of an object at runtime. Any form of examination may be supported in various embodiments. Introspection by the UI library 58 may permit an app to rely on the UI library 58 to supply detent behavior, so that the app developer need not provide detent behaviors if the UI library behaviors are acceptable/desirable for the app's interaction with the user. That is, the app developer may simply invoke the UI elements in the scroll view for the app and the UI library 58 may apply appropriate detent behavior by introspecting the scroll view. While the blocks are shown in a particular order for ease of understanding, other orders may be used. The UI library 58 may include instructions which, when executed on a processor in the system, cause the system to implement the operation illustrated in FIG. 8. Introspection may be performed when an app launches, for example, to examine the scroll view for the app. If an app dynamically modifies the scroll view during operations, introspection may be performed at the point at which the scroll view is modified.

The UI library 58 may examine the app's scroll view as a whole to determine if it is large enough to apply detent operations (decision block 100). If the entire scroll view is visible on the display screen 38, for example, there may be no detent operations to perform other than mechanical detent operations. Accordingly, if the scroll view is not large enough (decision block 100, "no" leg), the UI library 58 may apply no detent operations to the scroll view (block 102).

If the app's scroll view as a whole is large enough to apply detent operations (decision block 100, "yes" leg), the UI library 58 may determine if the app has provided a custom detent provider to provide detent operations (decision block 104). In other embodiments, the order of determining if there is a custom detent provider and examining the scroll view as a whole may be the opposite of that shown in FIG. 8. If the app has provided a custom detent provider (decision block 104, "yes" leg), the UI library 58 may execute the custom detent provider (block 106). The custom detent provider may, in an embodiment, implement a portion or all of blocks 92 and 94 shown in FIG. 7.

In addition to providing a custom detent provider, the app may also indicate that detent operations should be skipped for a portion of the scroll view (e.g. one or more UI elements in the scroll view). If the app has indicated skip (decision block 108, "yes" leg, the UI library 58 may skip the indicated elements (block 110). The skip indication may be one type of modification to the UI element attributes that may be performed by an app (block 94 in FIG. 7). If the app has specified a detent operation for a UI element (e.g. by modifying the attributes, block 94 in FIG. 7—decision block 112, "yes" leg), the UI library 58 may leave the specified detent operation in place for the UI element, i.e. using the specified detent operation (block 114). The specified detent operation may be considered in applying detent operations to other parts of the scroll view, however, to provide a unified overall experience for the user. For the remaining UI elements (decision block 100, "yes" leg and decision blocks 104, 108, and 112, "no" legs), the UI library 58 may scan the elements and mark notches for major detents (block 116).

Figure 9:
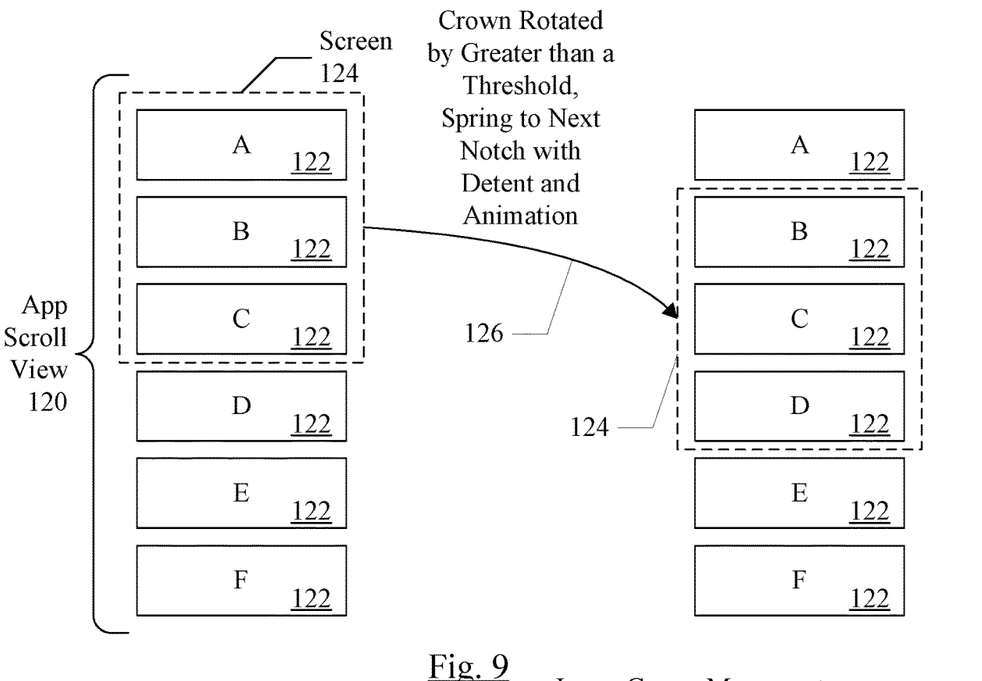
FIG. 9 is a block diagram of one embodiment of notches.

FIG. 9 is a block diagram illustrating notches for one embodiment of the system. The app's scroll view 120 is illustrated, including UI elements 122 labeled "A", "B", "C", "D", "E", and "F". The UI elements 122 may be displayed end to end according to the scroll view 120. That is, the UI elements 122 maybe displayed as a vertical list. The scroll view 120 is larger than may be concurrently displayed on the display screen 38. A dashed box 124 illustrates the portion of the scroll view that may be visible on the display screen 38 at a given point in time. In this example, 3 UI elements may be displayed on the display screen 38 concurrently, although other embodiments may display more or fewer elements concurrently.

Each UI element 122 may be assigned a notch in this example. In the notch model, movement of the displayed UI elements 122 in the scroll view 120 may be based on the rotation of the crown 12 by a specified amount that causes the display to spring from one notch to the next, removing one currently-viewed UI element 122 from view and displaying a currently-unviewed UI element 122. An animation event may occur as well, snapping the UI elements into view and out of view and providing a spring-like behavior in which a small delta of up and down (as viewed on the screen 38) movement is provided before settling to the new view. A major detent operation may be played when springing from notch to notch.

On the left side of FIG. 9, an initial view is illustrated in which UI elements 122 "A", "B", and "C" are visible on the display screen 38. When the user rotates the crown 12 by greater than a specified threshold amount, the UI library 58 springs to the next notch (arrow 126), playing a major detent operation and animating the spring. Thus, in this example, the spring may be the animation operation and the major detent operation may be synchronized to the spring. The displayed portion of the scroll view settles to displaying UI elements 122 "B", "C", and "D". That is, previously-viewed UI element 122 "A" has rotated out of view and newly-viewable UI element 122 "D" has rotated into view. The resulting view is illustrated on the right side in FIG. 9.

The operation illustrated in FIG. 9 may occur in response to rotation of the crown 12 in a particular direction (e.g. clockwise). Further rotation in the same direction by greater than the threshold amount may cause another spring between notches, which would result in UI elements 122 "C", "D", and "E" being visible. Rotation in the opposite direction may result in springing in the opposite direction. For example, from the right side in FIG. 9, rotation of the crown 12 counter clockwise by greater than the threshold amount would result in the view shown on the left side in FIG. 9.

The threshold amount for springing between notches may be set at any desired amount, and may be programmed in the system and/or may vary from app to app. For example, an app having more UI elements visible at the same time may use a smaller amount of crown movement to move from notch to notch as compared to another app having fewer UI elements visible at the same time.

Figure 10:
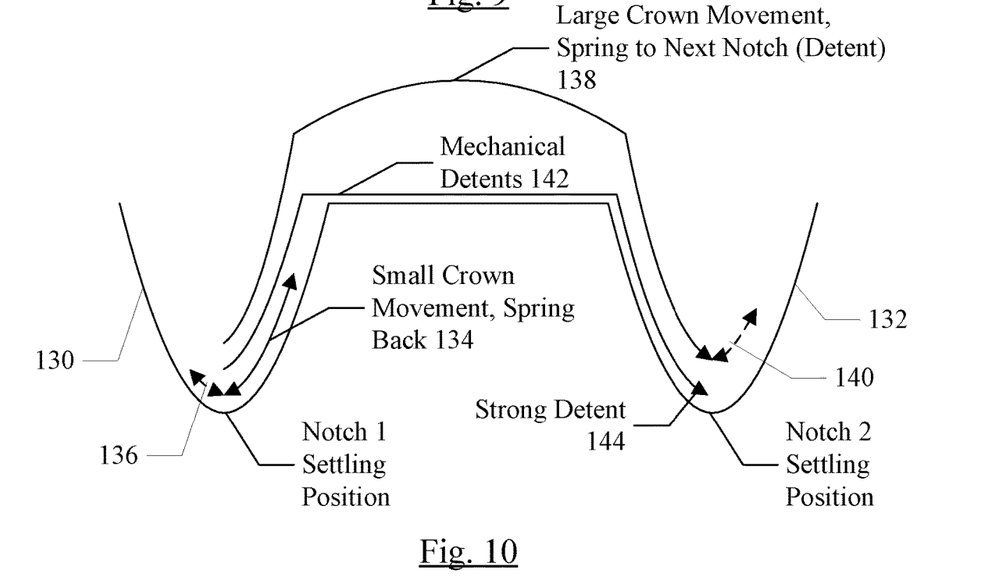
FIG. 10 is a block diagram illustrating notch behaviors for one embodiment.

In an embodiment, the notch and spring operation may be modeled as wells, where the depth of the well represents the amount of crown rotation needed to spring from one notch to the next. FIG. 10 is a block diagram illustrating the well model. Two adjacent wells 130 and 132 are shown, with the well 130 associated with notch settling position 1 (e.g. the left side of FIG. 9) and the well 132 associated with notch settling position 2 (e.g. the right side of FIG. 9). Beginning in notch position 1/well 130, a small amount of crown movement, followed by a stop in the movement of more than a predefined duration, causes the UI library 58 to remain in the well 130 (arrow 134). The UI library 58 may spring back to the notch settling position, possibly with a small amount of overshoot that might be represented by the small up and down movement on the display screen 38. The overshoot is illustrated by dotted line 136. If the crown is rotated far enough to move out of the well 130, the UI library 58 may spring to the next notch 132, playing a major detent operation (arrow 138). Again, there may be some overshoot after entering the well 132, illustrated by dotted arrow 140, before settling into the bottom of well 132 at notch position 2.

Another option that may be employed by an app is to disable the spring behavior and instead play mechanical detent operations as crown rotation is translated into a smooth scrolling motion from one notch to the next (arrow 142). Crown rotation may move up and out of well 130, but instead of springing to well 132 the UI library 58 may scroll as the movement crosses the area between the wells 130 and 132, playing mechanical detents along the way. When the well 132 is reached, the movement may fall into the well 132 and a strong detent operation may be played (arrow 144).

Figure 11:
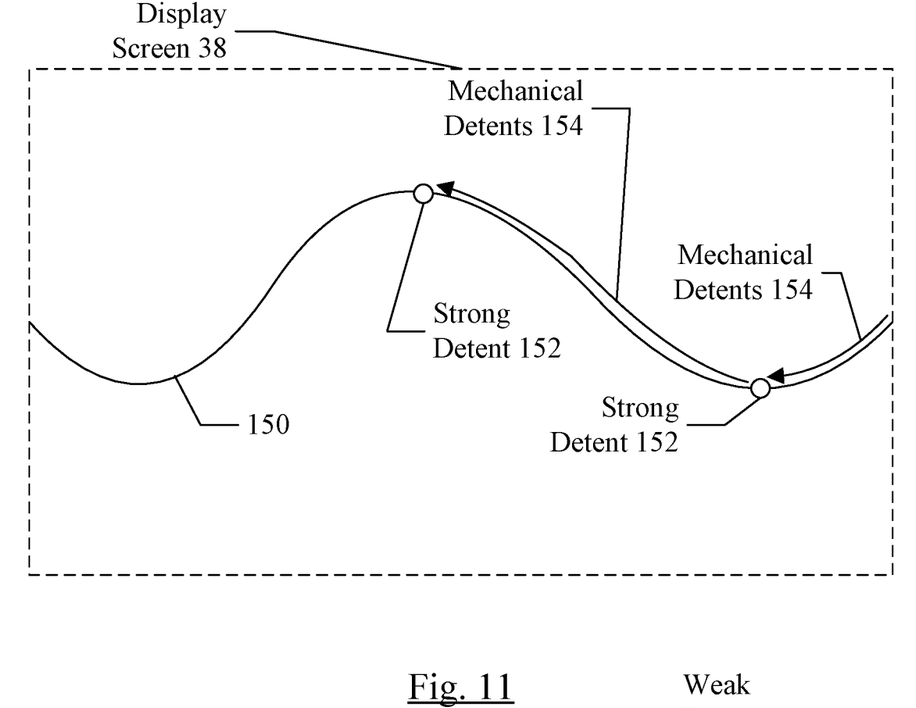
FIG. 11 is a block diagram illustrating another detent behavior for an embodiment.

FIG. 11 is a block diagram illustrating another embodiment of a UI element and associated detent operations. The embodiment of FIG. 11 is referred to as "solar" and may track the solar events that may happen through a given day. The wavy line 150 displayed on the display screen 38 may represent the path of the sun above and below the horizon as viewed from the user's location on earth. On the actual screen 38 during use, gradations in color between daylight (top) and night (bottom) may be used to approximate the amount of light at various times during the day. The user may follow along the wavy line 150 by moving the crown 12, with positions along the line wavy line 150 indicating various times. Mechanical detent operations 154 may be played as the user rotates the crown 12 to move along the wavy line 150. However, various solar nodes may be encountered which may display the time at which the node occurs. Solar nodes may include noon, midnight, twilight, sun rise, sun down, etc. When a solar node is reached, a major detent operation may be played and the information related to the solar node (e.g. a strong detent operation 152 may be associated with the solar nodes). Thus, the animation event for the solar nodes may be the display of the information, and the major detent operation may be synchronized to the animation event.

Figure 12:
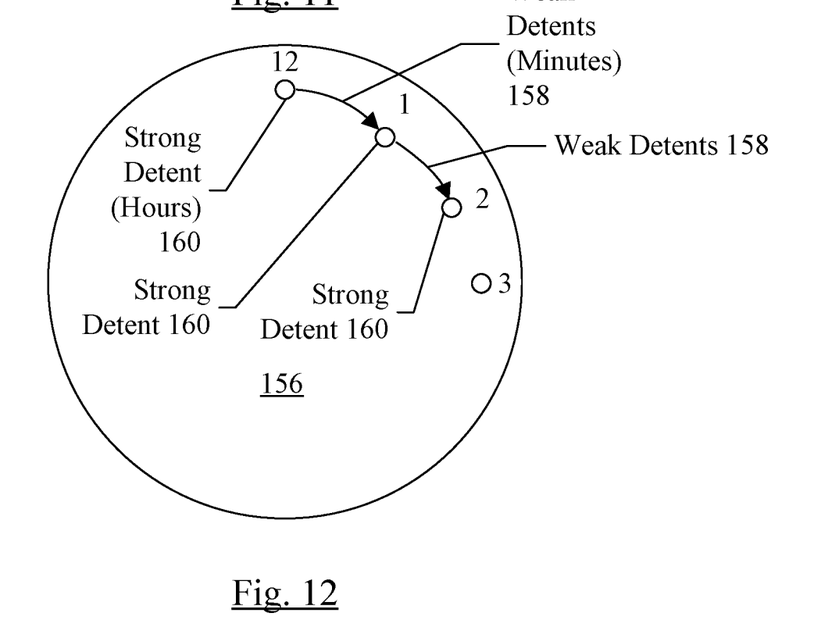
FIG. 12 is a block diagram illustrating yet another detent behavior for an embodiment.

FIG. 12 is a block diagram illustrating one embodiment of a UI element that represents a clock face 156. The user may use crown movements to move hands on the clock face 156 (not shown) to set an alarm or to set the time, for example. Thus, animation events may be movement of the minute hand between minutes, and movement of the hour hand between hours. Weak detent operations 158 may be used as the crown movements cause the minute hand to pass minutes on the clock face 156, since the minutes are encountered frequently while the rotation occurs. Strong detent operations 160 may be used when hours are encountered (e.g. the small hand of the clock arrives on an hour), since those occur less frequently as the crown is rotated to set the alarm. Thus, in this example, the animation events may be movements of the minute hand between minutes and the weak detent operation may be synchronized to the minute hand movements, while the movements of the hour hand between hours may be animation events to which strong detent operations are synchronized.

Figure 13:
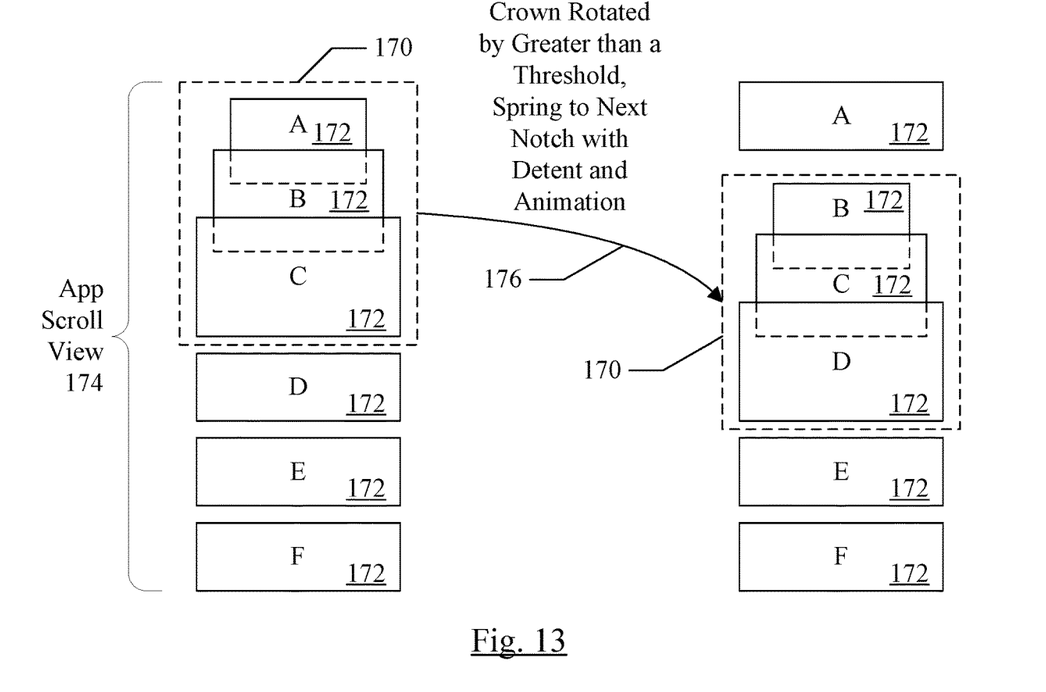
FIG. 13 is a block diagram of another embodiment of notch behavior with platters.

FIG. 13 illustrates the use of notches with a platter display, for an embodiment. In this embodiment, platters 172 may be currently visible in an overlapped, three dimensional (3D) display on the display screen 38. The display screen 38 is illustrated as the dotted box 170 in FIG. 3. The platters 172 that are visible (e.g. platters 172 labeled "A", "B", and "C" in FIG. 3 on the left side) are displayed overlapping and slightly smaller as they fall toward the background. For example, on the left side in FIG. 13, the platter 172 "A" is smallest and farthest back of the visible platters 172, overlapped by larger platter 172 "B" as illustrated by the dotted section of platter 172 "A" in FIG. 13; and platter 172 "C" is largest and full visible in the foreground, overlapping a portion of the platter 172 "B". Platters 172 "D", "E", and "F" are not currently visible and are shown as part of the app's scroll view 174.

Each platter 172 may be assigned a notch, and when the user rotates the crown 12 by greater than a threshold amount, the UI library 58 may spring to the next notch (arrow 176), playing a major detent operation. Thus, the animation event in this example may be the spring from one platter 172 to another platter 172 and the major detent operation may be synchronized to the spring. The platter 172 "A" may cease to be visible, and the platter 172 "D" may be in the foreground after the spring has settled, illustrated on the right side of FIG. 13. The platter 172 "B" has become smaller than it was on the left side, and is the farthest back of the visible platters 172. The platter 172 "C" is no longer in the foreground, overlapped by the platter 172 "D", and is smaller than it was on the left side of FIG. 13. While the example of FIG. 13 has 3 platters visible at any given time, other embodiments may display more or fewer platters concurrently. The number of displayed platters may vary from app to app as well, in some embodiments.

As with the discussion of FIG. 9, rotation of the crown 12 in a given direction (e.g. clockwise) may cause the spring from the left side of FIG. 13 to the right side. Further rotation in the same direction by greater than the threshold amount would cause a spring to displaying platters 172 "E" (in the foreground) overlapping platter 172 "D", which would overlap platter 172 "C" as the furthest back visible platter 172, and platter 172 "B" would no longer be visible. Rotation in the opposite direction (e.g. counter clockwise) by greater than the threshold amount would result in springing back from the view shown on the right side of FIG. 13 to the left side of FIG. 13.

Figure 14:
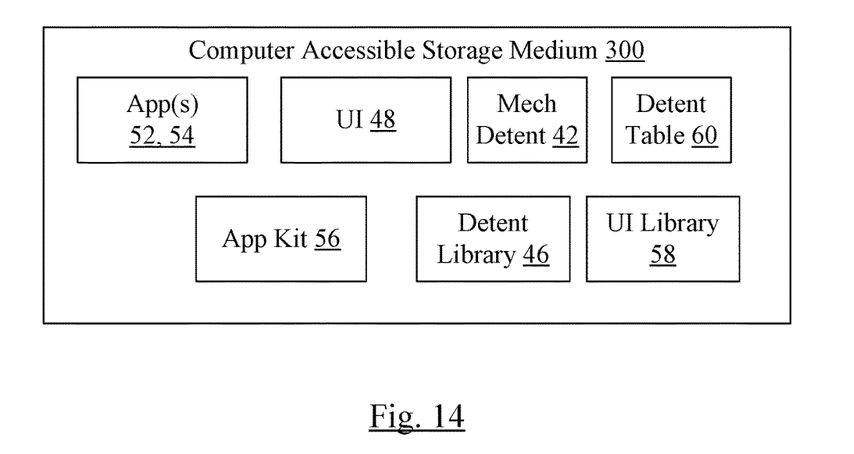
FIG. 14 is a block diagram of one embodiment of a computer accessible storage medium.

FIG. 14 is a block diagram of one embodiment of a computer accessible storage medium 300. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 300 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 300 in FIG. 14 may store code forming one or more of the apps 52 and/or 54, the UI program 48, the mechanical detent program 42, the app kit 56, the detent library 46, the UI library 58, etc. The computer accessible storage medium 300 may still further store one or more data structures such as the detent table 60. The apps 52 and/or 54, the UI program 48, the mechanical detent program 42, the app kit 56, the detent library 46, and/or the UI library 58 may comprise instructions which, when executed, implement the operation described above for the respective code.

Numerous variations and modifications will become apparent to those skilled in the art once the above disclosure is fully appreciated. It is intended that the following claims be interpreted to embrace all such variations and modifications.

What is claimed is:

1. A system comprising:
a crown;
a display on which a user interface is displayed during use, wherein rotation of the crown causes a user application that is in a foreground on the display to detect a display event on the display, and wherein the display event is detected responsive to a first detected amount of rotation of the crown; and
a computer accessible storage medium storing a detent library comprising a plurality of instructions which, when executed on a processor in the system by the user application, requests a first detent operation responsive to detection of the display event, wherein the system enforces one or more limits on the user application, wherein the one or more limits constrain the first detent operation performed based on the request having been initiated by the user application, and wherein the first detent operation is separate from periodic mechanical detent operations.

2. The system as recited in claim 1, wherein the one or more limits include a requirement that the user application be executing in a foreground when the first detent operation is requested by the user application.

3. The system as recited in claim 1, wherein the one or more limits include a limit to how often the user application is permitted to request detent operations.

4. The system as recited in claim 1, further comprising a haptic actuator located proximate to the crown, wherein the first detent operation and a second detent operation include first wave forms that are performed by the haptic actuator to provide a detent effect for a user.

5. The system as recited in claim 4, further comprising a speaker, wherein the first detent operation and the second detent operation include second wave forms that are played on the speaker to enhance the detent effect.

6. The system as recited in claim 5, wherein the system includes a table programmable with first wave forms of the haptic actuator and second wave forms for the speaker for a plurality of detent operations including the first detent operation and the second detent operation, and wherein the detent library is configured to load the table during initialization of the system.

7. The system as recited in claim 6, wherein the table further includes a first default gain for the first wave forms and a second default gain for the second wave forms.

8. The system as recited in claim 6, wherein a third detent operation and a fourth detent operation have the same first wave form forms but different first default gains.

9. The system as recited in claim 8, wherein the first detent operation is modeled as a well, and wherein the first detected amount of rotation is sufficient to move a detent out of the well and spring into an adjacent well.

10. The system as recited in claim 9, wherein the first detent operation corresponds to moving between notches on the display.

11. A system comprising:
a crown;
a display on which a user interface is displayed during use, wherein rotation of the crown causes a display event on the display, and wherein the display event is detected responsive to a first detected amount of rotation of the crown; and
a computer accessible storage medium storing a detent library comprising a plurality of instructions which, when executed on a processor in the system, requests a first detent operation responsive to detection of the display event, wherein the system is configured to perform periodic detent operations in response to crown movements, and wherein the detent library is configured to disable, in response to the first detent operation request, the periodic detent operations prior to transmitting the first detent operation request.

12. The system as recited in claim 11, wherein the detent library is further configured to enable the periodic detent operations subsequent to performance of the first detent operation.

13. A non-transitory computer accessible storage medium storing a plurality of instructions which, when executed, implement on a system:
a user interface program configured to detect a display event on a display screen of the system to which a detent operation is assigned; and
a detent library configured to invoke detent operations on the system, wherein the user interface program is configured to request the detent operation and the detent library is configured to transmit the detent operation request to hardware in the system that performs the detent operation, [[and]] wherein the hardware is configured to perform periodic detent operations in response to crown movements, and wherein the detent library is configured, in response to the detent operation request, to disable the periodic detent operations prior to transmitting the detent operation request.

14. The non-transitory computer accessible storage medium as recited in claim 1, wherein the detent library is further configured to enable the periodic detent operations subsequent to performance of the detent operation.

15. The non-transitory computer accessible storage medium as recited in claim 1 further comprising a user interface library configured to examine a plurality of user interface elements instantiated by an application to assign a plurality of detent operations to the user interface elements, wherein an animation event between the user interface elements causes the assigned detent operation to be performed.

16. The non-transitory computer accessible storage medium as recited in claim 1, wherein the detent library is configured to load a table of detents in the hardware during initialization of the system.

17. The non-transitory computer accessible storage medium as recited in claim 1, wherein the detent library is executable from a user application on the system, whereby the user application directly requests the detent operation using the detent library in response to the display event in the user application.

18. The non-transitory computer accessible storage medium as recited in claim 17, wherein the system enforces one or more limits on the detent operations initiated by the user application.

19. The non-transitory computer accessible storage medium as recited in claim 18, wherein the one or more limits include a requirement that the user application be executing in a foreground when a detent operation is requested by the user application.

20. The non-transitory computer accessible storage medium as recited in claim 18, wherein the one or more limits include a limit to how often the user application is permitted to request detent operations.

* * * * *